United States Patent [19]
Dimitrijevic et al.

[11] Patent Number: 5,978,363
[45] Date of Patent: *Nov. 2, 1999

[54] SYSTEM AND METHOD FOR MULTI-DIMENSIONAL RESOURCE SCHEDULING

[75] Inventors: Dragomir D. Dimitrijevic; Dale Berisford, both of Germantown, Md.

[73] Assignee: Telogy Networks, Inc., Germantown, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,475

[22] Filed: Oct. 18, 1996

[51] Int. Cl.$^6$ ............................ H04B 7/185; H04B 7/212
[52] U.S. Cl. .................... 370/319; 455/12; 455/13
[58] Field of Search ..................... 370/316, 317, 370/318, 319, 320, 325; 455/12, 13

[56] References Cited

U.S. PATENT DOCUMENTS

| | | |
|---|---|---|
| 3,683,116 | 8/1972 | Dill . |
| 4,273,962 | 6/1981 | Wolfe . |
| 4,450,582 | 5/1984 | Russell . |
| 4,813,036 | 3/1989 | Whitehead .............................. 370/325 |
| 4,870,642 | 9/1989 | Nohara et al. ........................... 370/319 |
| 4,896,369 | 1/1990 | Adams, Jr. . |
| 4,995,096 | 2/1991 | Isoe . |
| 5,038,398 | 8/1991 | Willis . |
| 5,216,427 | 6/1993 | Yan et al. ............................... 342/352 |
| 5,327,432 | 7/1994 | Zein Al Abedeen . |
| 5,363,374 | 11/1994 | Zein Al Abedeen et al. ........... 370/233 |
| 5,392,450 | 2/1995 | Nossen . |
| 5,430,732 | 7/1995 | Lee et al. ................................ 370/319 |
| 5,448,621 | 9/1995 | Knudsen . |
| 5,485,464 | 1/1996 | Strodtbeck et al. ..................... 370/319 |
| 5,519,404 | 5/1996 | Cances et al. ........................... 370/319 |
| 5,526,404 | 6/1996 | Wiedeman et al. ..................... 455/430 |
| 5,537,397 | 7/1996 | Abramson . |
| 5,537,406 | 7/1996 | Binger . |
| 5,572,530 | 11/1996 | Chitre et al. ............................ 370/524 |
| 5,592,481 | 1/1997 | Wiedeman et al. ..................... 370/316 |
| 5,625,624 | 4/1997 | Rosen et al. ............................ 370/307 |
| 5,655,005 | 8/1997 | Wiedeman et al. ..................... 370/320 |
| 5,669,062 | 9/1997 | Olds et al. .............................. 455/509 |
| 5,708,965 | 1/1998 | Courtney ............................... 455/13.4 |
| 5,749,044 | 5/1998 | Natarajan et al. ..................... 455/13.1 |

Primary Examiner—Allen R. MacDonald
Assistant Examiner—James W. Myhre
Attorney, Agent, or Firm—Stephen C. Glazier; Pillsbury Madison & Sutro LLP

[57] ABSTRACT

A system and method is presented for multi-dimensional scheduling, unscheduling, and control of resources using a database approach. Indivisible resources, percentage divisible resources, and range divisible resources are scheduled, unscheduled, and controlled. Resources in telecommunication systems are scheduled, unscheduled, and controlled. Resources in satellite telecommunication systems are scheduled, unscheduled, and controlled.

5 Claims, 10 Drawing Sheets

Microfiche Appendix Included
(1 Microfiche, 23 Pages)

SYSTEM AND METHOD FOR MULTI-DIMENSIONAL RESOURCE SCHEDULING

This application includes a microfiche appendix.

BACKGROUND OF THE INVENTION

The field of this invention is systems and methods for computerized resource scheduling and control. Parts of this invention also extend to resource scheduling and control for indivisible resources, percentage divisible resources, and range divisible resources. Parts of this invention also extend to scheduling and control of resources for telecommunication systems generally, and satellite communication systems specifically.

The prior art in this field is limited and inadequate to effectively schedule and control resources properly in all currently required circumstances. The prior art has software that merely schedules current use of satellite systems but does not control the systems. This prior art merely produces a schedule and does not actually control the systems. Furthermore, the prior art only schedules current use, and does not schedule future use.

SUMMARY OF THE INVENTION

It is an object of the present invention to provide new improvements in systems and methods to schedule and control resources with computers, including indivisible resources, percentage divisible resources, and range divisible resources, including resources in telecommunication systems, and specifically in satellite communication systems.

It is an object of the present invention to provide software, systems and methods to schedule resources for satellite telecommunication systems, and to control the resources in the systems pursuant to the schedules, and to provide such scheduling and control both for current use and for use in the future.

The present invention includes a system and method for multidimensional scheduling and control, using a database approach, of resources. Software algorithms are used to schedule and control indivisible resources, percentage divisible resources, and range divisible resources. Resources in telecommunication systems, including satellite telecommunication systems, are scheduled and controlled.

DESCRIPTION OF THE PREFERRED EMBODIMENTS

Figure 1:
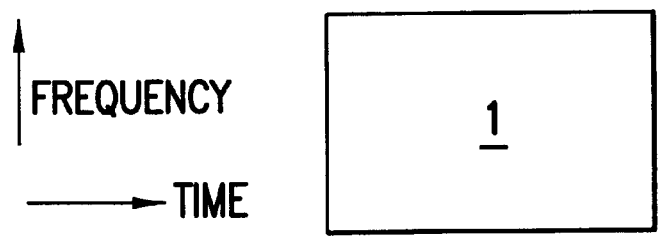
FIG. 1 shows an example of an initial schedule of a resource.

1. A Database Approach to a General System and Method for Multi-Dimensional Resource Scheduling 1.1 Introduction The present invention includes a number of algorithms described herein for scheduling of various types of resources using a database in a multi-user environment. The algorithms were originally developed for scheduling in Demand Assigned Multiple Access (DAMA) networks. However, the described algorithms may be used to schedule any other type of resource.

1.1.1 Types of Resources

This invention deals with three types of resources:

1. Indivisible Resources are scheduled on an all-or-nothing basis in a certain period of time. An example may be transponders on a satellite which is, at each instance of time, either available, or entirely assigned to one connection and hence unavailable.

2. Percentage Divisible Resources may be shared among various events (users). At any instance of time, each event may take a certain percentage of the total resource capacity. Total utilization of the resource capacity cannot exceed 100%. An example of such a resource is power on a satellite. At any instance of time, various events scheduled on various transponders may require a certain percentage of maximum power available on the satellite, and total power requirements cannot exceed total available power. The percentage divisible resources may be scheduled in discrete or continuous increments. As an example of discrete scheduling, a hypothetical resource called "Pool Of Hammers" may consist of four hammers, and resource utilization at any instance of time may be 0, 25, 50, 75, or 100 percent. However, if hammers are tagged and if it is sought to keep track of which hammer is assigned to which project, then they must be scheduled as four indivisible resources.

3. Range Divisible Resources may be shared among various events. Each event requires certain bandwidth (in an indivisible block) of the entire resource. An example may be a Demand Assigned Multiple Access (DAMA) transponder on a satellite. Its total bandwidth may be 14.000–14.075 GHz (that is a 75 MHz bandwidth). When an event requires 1 MHz, it is important to distinguish and properly schedule lower and upper frequency of the 1 MHz bandwidth (e.g., 14.001–14.002 GHz has to be distinguished from 14.005–14.006 range).

1.1.2 Operations with Resources

This invention deals with several operations with resources:

1. Creation of a new resource includes creation of a new record which contains resource specific information.

Also, the fact that the resource is available has to be entered in the database.

2. Modification of a resource is the process of changing characteristics of an already existing resource. Changes must conflict with already scheduled events, and any such changes must be prohibited before the affected event are either rescheduled or canceled.

3. Blocking of a resource is a special kind of modification or scheduling when the resource becomes unavailable in a certain period of time although it is not assigned to any particular event. An example may be a resource that is unavailable due maintenance.

Blocking must not conflict with scheduled events.

4. Deletion is the process of permanent removal of a resource from the system. Deletion must not conflict with scheduled events.

1.1.3 Operations with Schedules

This invention does several operations with schedules:

1. Initialization is the process of making an initial schedule when there are no scheduled events and all resources are available.

2. Scheduling is the process of making a reservation of a resource for certain event.

3. Unscheduling is the process of freeing a resource taken by an event.

4. Inquiry is the process of finding an available time slot and satisfying needs of an event. An inquiry may be completely or partially defined. In a time domain, a completely defined inquiry includes start and stop times. A partially defined inquiry includes either start time, or stop time, or duration of an event. As an example, the invention may need to find a half hour slot without strict requirements about actual start and stop time. Or, the invention may need to start today at noon, without strict requirements about actual end time. In the case of an inquiry in a frequency domain (a range divisible resource), a 14.000–14.001 GHz range (a completely specified inquiry in frequency domain) may be sought, or a 1 MHz bandwidth may be needed. Besides the aforementioned parameters, inquiries may specify other resource-specific characteristics such as weight or color, or, in case of satellite transponders, footprints of their downlink beams.

5. Garbage Collection is the process of removing database records after they become outdated. As an example, the database may contain a record of a resource which is available from noon to 1 PM today. After 1 PM today, the record is obsolete and cannot be used. Therefore, it should be deleted in order to reduce the size of the database.

1.1.4 Database Size

The present invention assumes that a schedule may be defined with numerical and date/time types of variables. In case of a numerical variable, the invention assumes the maximum precision available in standard databases. This precision (approximately 15 accurate digits) requires 8 bytes of memory. Similarly, a date/time variable requires 8 bytes. These sizes will be taken into account while calculating the size of a database in the described algorithms.

Depending on the particular application, resource ID may be textual or numeric and the size of the corresponding database field may vary from one byte (with numeric ID in the 0–255 range) to virtually anything (i.e., arbitrary text). Since, for efficiency purposes, this field is indexed. Some databases may impose a limit of 255 characters (bytes) of arbitrary text. Here, for database size calculation purposes, the invention assumes that the resource ID fits in 8 bytes of memory. This may cover a case of 8 characters long resource ID, or a numeric value (double) with approximately 15 accurate digits. If the type of resource ID is required (like in SQL expressions), the invention assumes a textual type.

A "Status" field is used which characterizes status of a certain time slot. In the simplest case, it may be "available" or "unavailable". In a more general case, it may have some other values like "out" for maintenance purposes. In any case, the invention assumes that the "Status" field is an integer value (1 and 2 being assigned to "available" and unavailable slots respectively) and its size is 2 bytes.

For each of the scheduling algorithms, the worst case database size is shown. Ideally, the database size grows linearly with the number of scheduled events, or equivalently, the database size increases for not more than some fixed number of bytes for each new scheduled event.

1.1.5 Scheduling in a Multi-User Environment

Scheduling in a multi-user environment raises the problem of database integrity. Scheduling may consist of a number of steps which modify the database. They are handled as an indivisible operation, i.e., once one user starts updating the database, all other users should be barred from modifying the database. Also, scheduling may fail in the midst of the process, e.g., due to unavailability of a resource. Therefore, there should be a mechanism to undo the already performed changes. Fortunately, modern databases can handle a multitude of database modifications as transactions, i.e., a sequence of uninterruptable modifications. Also, they provide a rollback mechanism to undo partial changes. As an example, BeginTrans, CommitTrans, and Rollback methods of Microsoft Access Basic (the language used to implement the algorithms in the appendices hereof) take care of database integrity in multi-user environments. These methods are used outside of the algorithms shown in the appendices.

In the case of scheduling information filed manually (e.g., by satellite operators), the inquiry produces a list of available resources. Although, the operator selects an available resource to schedule it, the resource may not be available at scheduling time. This may happen when another user scheduled the resource after the list of available resources is generated, and before the operator actually requested the resource.

In this description, it is assumed that all the described algorithms are executed without interruption or interference by other users.

1.1.6 Miscellaneous

The schedule is kept in a table called "Schedule". The structure of its records depend on the type of resources being scheduled.

Two date/time type constants are defined:

1. BeginningOfTime is the earliest possible time that can be used in the scheduler. For practical purposes, it may be some time before commissioning the scheduler.

2. EndOfTime is the latest possible time that can be used in the scheduler. For practical purposes, it may be defined by the longest lifetime of scheduled resources.

A high level description of the underlying algorithms is given below, and strict code for each algorithm in Microsoft Access Basic (Visual Basic) is given in Appendices A, B, and C, hereof.

1.2 Indivisible Resources

Indivisible resources are scheduled on an all-or-nothing basis. Information about various time-slots are kept in corresponding database records. Initially, a schedule for each resource consists of one big available slot and the corresponding record. As events are scheduled, the initial available time slot is chopped to smaller slots with appropriate starting and ending times and statuses (available or unavailable). Each new time slot produces a new corresponding record.

1.2.1 Record Structure

The record structure is as follows:

1. ResourceID field identifies the record's corresponding resource.
2. From field defines the starting time of a particular time slot.
3. To field defines the ending time of a particular slot.
4. Status field defines the status of a particular slot.

Total size of a record is 26 bytes.

1.2.2 Initialization

Initially, all resources are available. For that reason the "Schedule" table is cleared and one record per resource is created as follows:

1. ResourceID=corresponding resource ID
2. From=BeginningOfTime
3. To=EndOfTime
4. Status=1 (available)

1.2.3 Inquiry

Inquiry in the time domain may contain desired start or stop times. In case both times are specified, the invention finds an available slot (record) which contains the specified slot. In case only start time is specified, the invention finds an available slot such that From is equal or before the required start and To is strictly after the required start. Similarly, in case only end time is specified, the invention finds an available slot such that From is strictly before the required end time, and To is equal to or after the required end. In case neither start nor end is specified, the invention looks for any available slot.

Another way to make an inquiry is to search for a sufficiently long time interval. In this case, to improve efficiency, records have an indexed field which contains the length of a time interval.

Depending on a particular application, more complex inquiries are possible, such as a sufficiently long interval in certain ranges of start and stop times.

1.2.4 Scheduling

Figure 12:
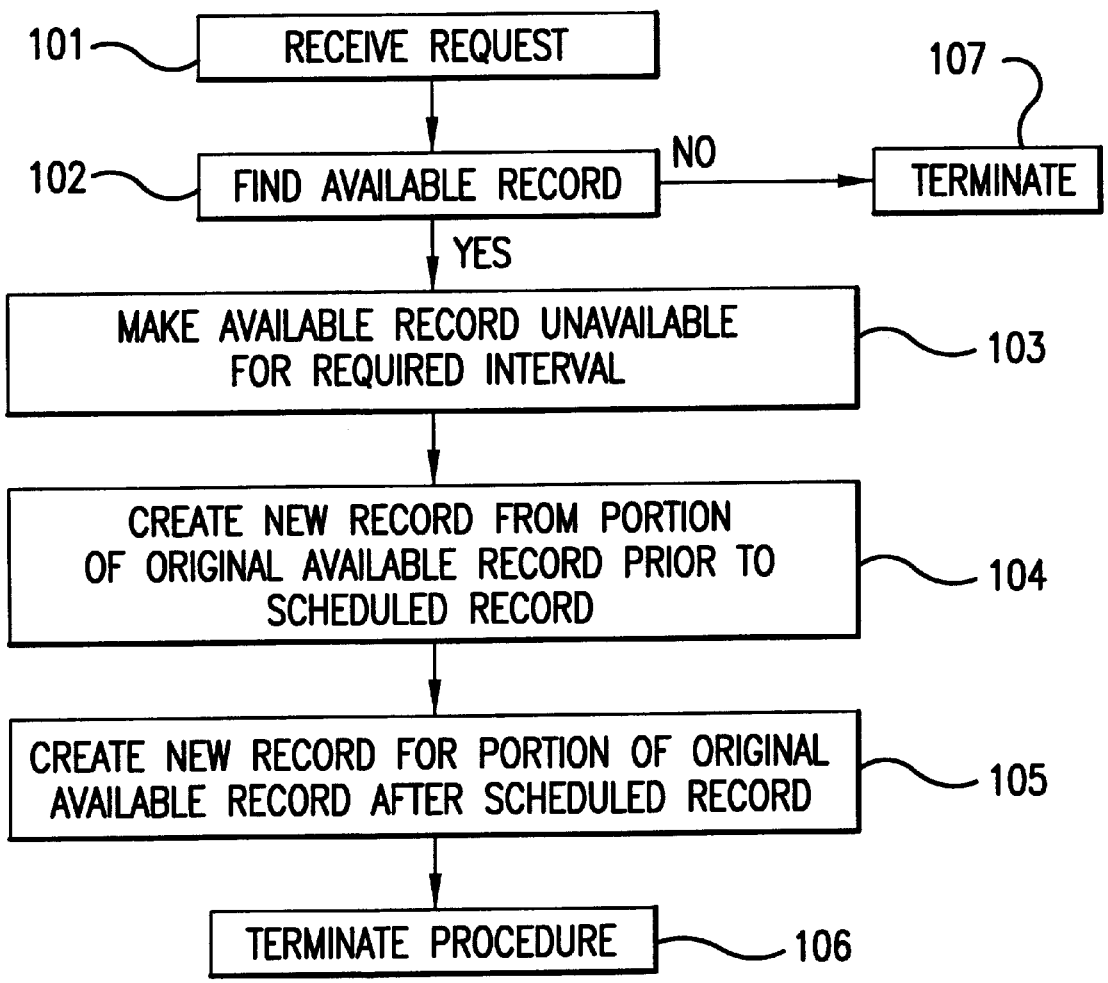
FIG. 12 shows a flow chart of the scheduling algorithm for indivisible resources.

To schedule resource X from T1 (starting time) to T2 (ending time), the scheduling algorithm shown in FIG. 12 runs as follows (where "ts" is start time, and "te" is end time) after a request to schedule a time slot is received 101:

1. Find 102 a record in the "Schedule" table in the database such that ResourceID=X, From≦T1 and To≧T2 and Status=1 (i.e. available). If there is only one such record, then that record is selected. If there is more than one such record, then in the preferred embodiment of the present invention the user selects the record (i.e., the individual resource unit) to be scheduled; however, the present invention may select from such multiple records in other alternative ways, for example, selecting the first such record. The request fails 107 if there is no such record. This step makes sure that the requested slot did not become unavailable in the multi-user environment.
2. Let ts=From, and te=To, i.e., record 103 the available period for use in subsequent steps. Change 103 the available time slot so that From=T1, To=T2, Status=2 (i.e., unavailable). This step records the fact that the requested interval became unavailable.
3. If ts<T1 create 104 a new record such that: ResourceID=X, From=ts, To=T1, and Status=1. This step creates a new available record prior the requested start in case the originally available time-slot starts prior the requested time-slot.
4. If te>T2 create 105 a new record such that: ResourceID=X, From=T2, To=te, and Status=1. This step creates a new available record after the requested end in case the originally available time-slot ends after the requested time-slot.
5. Terminate the procedure 106.

1.2.5 Unscheduling

Figure 13:
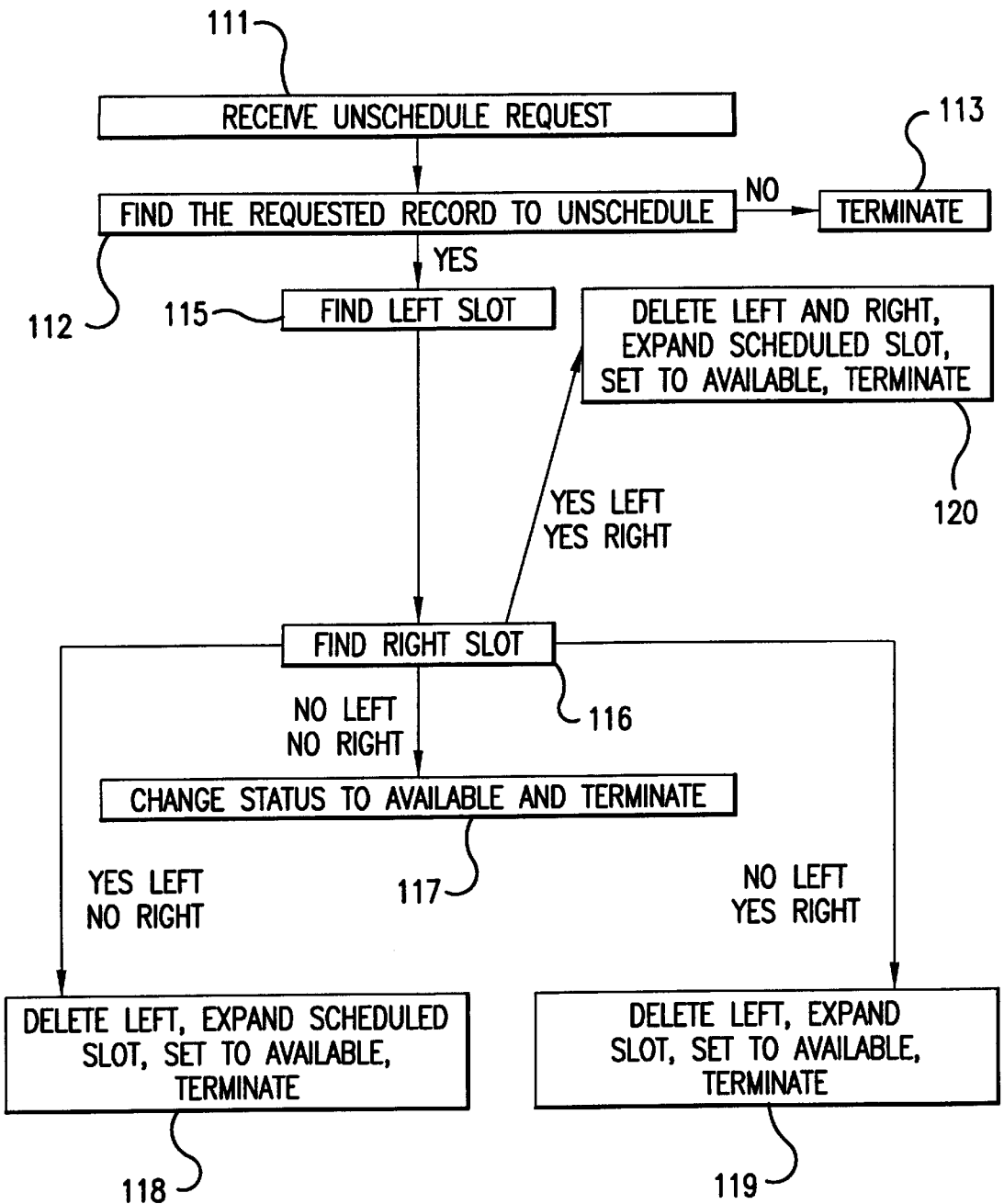
FIG. 13 shows a flow chart for the unschedule algorithm for indivisible resources.

To unschedule resource X from T1 (starting time) to T2 (ending time), the algorithm a shown in FIG. 13 runs as follows, often receiving 111 a request to unschedule that resource:

1. Find 112 the specified record which is about to be unscheduled. In case there is no such record, stop 113 the procedure. This may happen in a multi-user environment when two users compete to unschedule the event and one of them gets to unschedule it just before the other.
2. Find an available slot 115 which ends when the slot which is about to be unscheduled starts. Call it "left slot." In case there is no such slot, two events are scheduled back to back.
3. Find an available slot 116 which starts when the slot which is about to be unscheduled ends. Call it "right slot." In case there is no such slot, two events are scheduled back to back.
4. In case there are no left and right slots, change Status 117 of the unscheduled slot to 1 (available) and terminate the procedure.
5. In case there is no right slot and a left slot exists, delete 118 the left slot, set From of the unscheduled slot to be equal to From of the deleted left slot. Set Status 118 of the unscheduled slot to be equal to 1 (available). Terminate the procedure.
6. In case there is no left slot and a right slot exists, delete 119 the right slot, set To of the unscheduled slot to be equal to To of the deleted right slot. Set Status of the unscheduled slot to be equal to 1 (available). Terminate the procedure.
7. In case both left and right slot exist 120, delete them. Set From of the unscheduled slot to be equal to From of the deleted left slot. Set To of the unscheduled slot to be equal to To of the deleted right slot.

Set Status of the unscheduled slot to be equal to 1 (available). Terminate the procedure.

1.2.6 Garbage Collection

To eliminate all available slots prior to time T (i.e., outdated slots), delete all available records for which To≦T and modify From to become T for all records for which From<T<To.

1.2.7 Database Size

Each new event may add up to two new records to the schedule the maximum number of records (maximum fragmentation) is 2n+1 where n is the number of scheduled events. This happens when there are no events scheduled back-to-back with no available time between them.

1.2.8 Variations of the Algorithm

This section describes variations of the scheduling algorithm which may be needed in specific cases.

A. Guard Times

Depending on a specific application, although an interval (From, To) may be available, not all of it may actually be scheduled for various practical reasons such as:

1. The last ten minutes of an interval may be needed to relinquish the resource and prepare it for the next scheduled event.

2. In the scheduling of satellite resources, a user may schedule an event from 2 to 3 PM, and reserve the right to extend the event for another 30 minutes (approximate end). Then, although for example, the slot from 3 to 5 PM may appear to be available, interval 3–3:30 PM cannot be scheduled immediately. Conditions to reserve this interval depend on specific business practice. For example, a user who wants to schedule an event from 3:15 PM to 4 PM may have to challenge the user who scheduled the previous event. In order to keep the disputed interval, the first user may have to commit to using it. The user who wins the bid, may be subject to cancellation charges in case the event is canceled.

To handle guard times, two new fields may be needed: FromGuard, and ToGuard. An event may be scheduled only of it falls within the two bounds.

B. Other Time-Dependent Resource-Specific Characteristics

There may be other time-dependent resource-specific characteristics. For example, Earth stations used in satellite transmissions may be scheduled on an all-or-nothing basis. However, in case of transportable Earth stations, although a station is available on a certain date, it may not be scheduled since it is located in a different location. To handle this case, a Location field may be needed. An example of such a schedule is:

| Resource ID | From | To | Location | Status |
|---|---|---|---|---|
| XYZ | June 1, 1996 10 AM | June 1, 1996 11 AM | London | Available |
| XYZ | June 1, 1996 11 AM | June 1, 1996 1 PM | London | Unavailable |
| XYZ | June 1, 1996 1 PM | June 1, 1996 11 PM | London | Available |
| XYZ | June 1, 1996 11 PM | June 2, 1996 10 AM | | Unavailable |
| XYZ | June 2, 1996 10 AM | June 2, 1996 11 PM | Paris | Available |

In the above schedule, if one requests the resource on Jun. 1, 1996 between 3 and 5 PM in Paris, resource XYZ is actually unavailable since it is located in London at that time. An empty Location field may mean that the resource is in transition between the two locations.

There may be more than one resource-specific parameter. For example, an Earth station's antenna may be directed in different directions. A resource may be available in the requested interval and at the requested location, but the antenna may point in an inappropriate direction. In this case, a Direction field is needed.

In general, whenever one of the parameters is changed, a time slot record is split (when scheduling) or merged (when unscheduling) with neighboring slots which have all parameters equal, except for the one changed parameter (which may be time, status, location, direction, or otherwise).

1.3 Percentage Divisible Resources 1.3.1 Record Structure

The record structure is as follows:

ResourceID field identifies the record's corresponding resource.

FromT field defines the starting time of a particular time slot.

ToT field defines the ending time of a particular slot.

Power field defines availability of a particular slot. The name of the field is due to the original application for which the algorithm was developed, i.e., the scheduling of power on a satellite. The resource is unavailable in a certain slot if Power=0. Power defines the maximum value of power that can be reserved in a certain slot. If the requested interval spans over several time slots, then the maximum power that can be scheduled is defined by the minimum Power in the requested range of slots. The type of this field is "double" and its size is 8 bytes. Depending on the particular application, it may be reduced to, e.g., a 2 byte integer.

The total size of a record is 32 bytes.

1.3.2 Initialization

Initially, all resources are 100 percent available. For that reason the "Schedule" table is cleared and one record per resource is created as follows:

1. ResourceID=corresponding resource ID
2. FromT=BeginningOfTime
3. ToT=EndOfTime
4. Power=maximum power that can be handled by the resource.

1.3.3 Inquiry

An inquiry in the time domain is performed in the same way as it was described for indivisible resources.

In order to confirm that a request may be scheduled in the required time interval, inquiry in the power domain has to confirm that all affected slots have at least the required amount of power, i.e., the slot with the smallest amount of available power has to have at least the required amount of power.

1.3.4 Scheduling

The invention can schedule P amount of power in the time interval between S and E. In this particular case, P may be either positive or negative. A negative power is equivalent to unscheduling. In order to successfully schedule the requested amount of power, all the affected time slots must have at least the requested amount of power available. The affected time slots are such that S<ToT and E>FromT.

Figure 14:
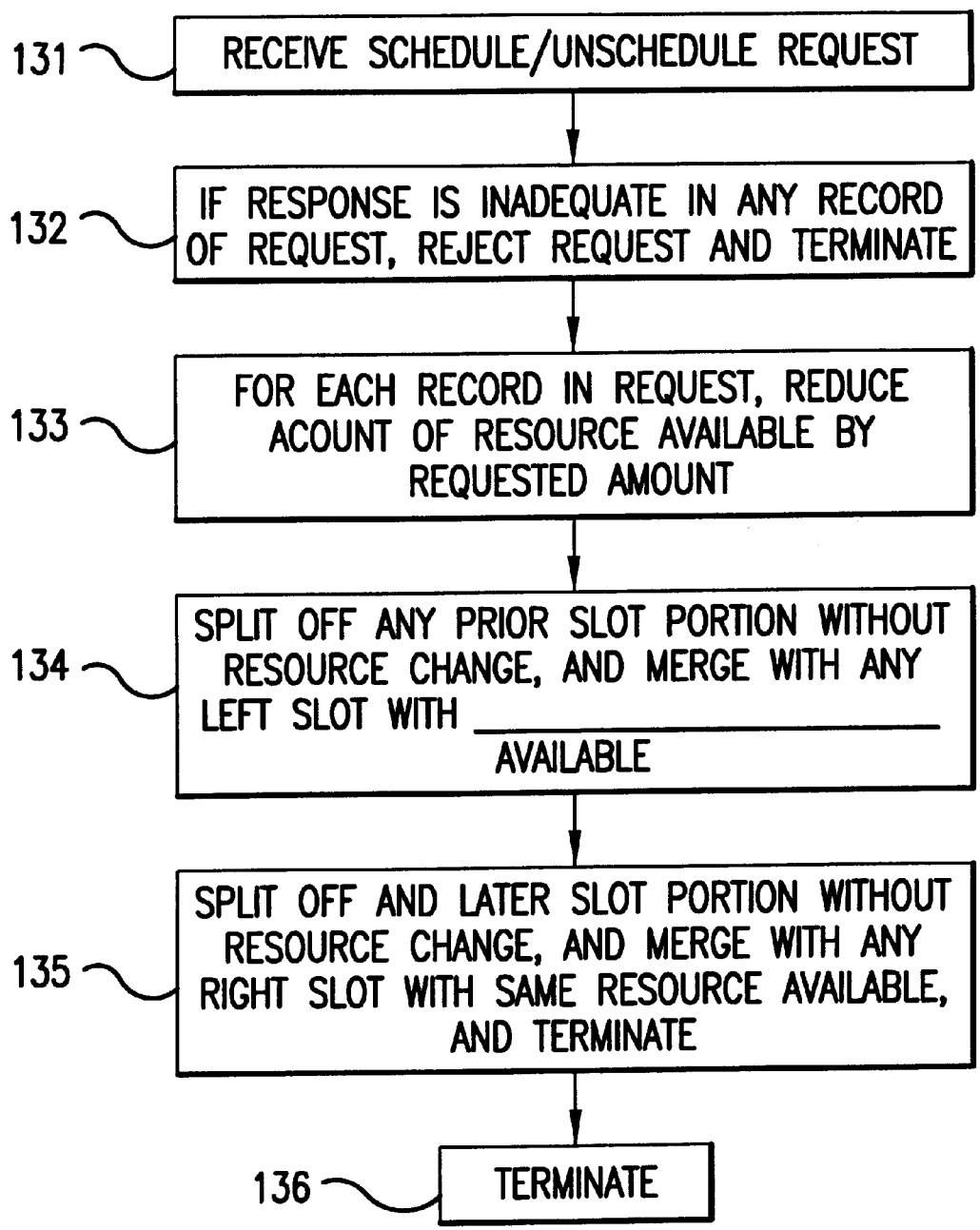
FIG. 14 shows a flow chart for the schedule/unschedule algorithm for percentage divisible resources.

The scheduling and unscheduling algorithm for percentage divisible resources is shown in FIG. 14, and runs as follows, after receiving 131 a request for such scheduling or unscheduling:

1. If Power>0 (scheduling), find 132 among the affected slots one that does not have enough power. If there is such a slot, scheduling fails 132. Otherwise go to next step. In case Power<0 (unscheduling), there is no need to perform step 1.
2. For each of the affected slots and their respective FromT, ToT, and Power, perform 133 steps 3 through 5.
3. Reduce 133 the amount of power for the required amount P.
4. If FromT<S<ToT, split 134 the slot to two slots ([FromT, S] and [S, ToT]) where the first slot has power as before scheduling, and the second slot has the original power reduced for the required amount of power. If FromT=S, check if the left slot (for which ToT=S) has the same amount of power as the slot being scanned after reduction. If yes, merge 134 the two slots into a single slot.
5. If FromT<E<ToT, split 135 the slot to two slots ([FromT, E] and [E, ToT]) where the second slot has power as before scheduling, and the first slot has the original power reduced for the required amount of power. If ToT=E, check if the right slot (for which FromT=E) has the same amount of power as the slot being scanned after reduction. If yes, merge 135 the two slots into a single slot.

6. Terminate 136 the procedure.

1.3.5 Unscheduling

Unscheduling in this case is the same as scheduling with a negative value of the requested power.

1.3.6 Garbage Collection

Garbage collection is similar to that described for indivisible resources.

1.3.7 Database Size

As in the case of indivisible resources, each new event may add up to two new records, and therefore, the maximum number of records for n scheduled events is 2n+1.

1.4 Range Divisible Resources

1.4.1 General Description

This type of scheduling is less intuitive and will be described in general terms prior actual formal description. The two dimensional scheduling algorithm was originally developed for scheduling of bandwidth on satellite transponders and for that reason, the other scheduling dimension (other than time) is denoted here as frequency. However, there is no reason that the other dimension cannot have some other meaning (e.g., length expressed in feet).

During the scheduling, the entire time/frequency space is partitioned into time/frequency slots. The slots may be available or unavailable. The slots are represented as rectangles in allowed time/frequency space. As a convention, the time domain is along the horizontal axis, and frequency is along the vertical axis. The allowed space is bound with StartOfTime and EndOfTime values in the time domain, and the minimum and maximum resource frequency in the frequency domain.

Initially, each resource is available in the entire time/frequency space, and thus has one available record in its schedule, as shown in FIG. 1. FIG. 1 is a graph of the entire resource space, where the horizontal axis is time and the vertical axis is the resource (in this example, frequency).

Figure 2:
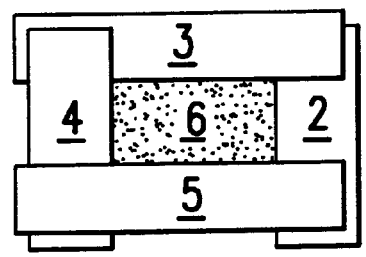
FIG. 2 shows an example of a resource with one event scheduled.

After an event is scheduled, the initial record is replaced with a number of new records (2, 3, 4, 5, and 6), as shown in FIG. 2. FIG. 2 is a modification of FIG. 1 after the resource is scheduled for one event. One of the records corresponds to the scheduled events (6), and the corresponding time/frequency slot is unavailable. Other new time/frequency slots are available (2, 3, 4, and 5). As can be seen in FIG. 2, available slots may intersect each other (e.g., 3 and 4). An unavailable slot cannot intersect with any other slot. (To make the Figures more understandable, overlapping slots are shifted up a little bit in the Figure to be shown three dimensionally).

In order to be scheduled successfully, each requested time/frequency slot must fit in (i.e., be a subset of) at least one available slot. The requested slot may also intersect (partially overlap) with other available slots. As an example, slot 10 in FIG. 3 was requested from the schedule shown in FIG. 2. It was a sub-set of slot 3, and therefore it could be scheduled. It also overlapped with slot 4 in FIG. 2.

Figure 3:
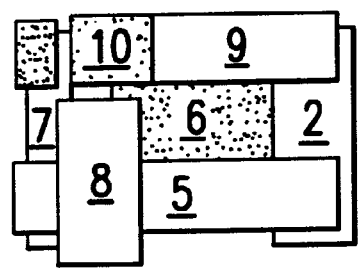
FIG. 3 shows an example of a resource with two events scheduled.

The scheduling of slot 10 in FIG. 3, caused deletion of affected slots 3 and 4, and addition of new slots. FIG. 3 is a modification of FIG. 2, after two events are scheduled. In order to keep the "Schedule" table as compact as possible, no available slot can be a sub-set of another available slot. Partition of slot 4 introduced slots 7 and 8 in FIG. 3. Partition of slot 3 produced new available slots 9 and the shaded slot left of the newly scheduled slot 10. However, the shaded slot is a subset of new available slot 7, and was not actually added to the table "Schedule".

After this informal description, the detailed description of the algorithm follows:

1.4.2 Record Structure

The record structure is as follows:

1. ResourceID field identifies the record's corresponding resource.
2. FromT field defines the starting time of a particular time/frequency slot.
3. ToT field defines the ending time of a particular time/frequency slot.
4. FromF field defines the low frequency of a particular time/frequency slot.
5. ToF field defines the high frequency of a particular time/frequency slot.
6. Status field defines status of a particular time/frequency slot.

The total size of a record is 42 bytes. In order to improve certain types of inquiries, it may be useful to add fields which would contain differences between starting and ending time and low and high frequencies. However, this is not essential for the scheduling purpose itself.

1.4.3 Miscellaneous Elements

Besides the "Schedule table", a "Temporary Table" is needed with the following fields:

1. FromT field defines the starting time of a newly created time/frequency slot.
2. ToT field defines the ending time of a newly created time/frequency slot.
3. FromF field defines the low frequency of a newly created time/frequency slot.
4. ToF field defines the high frequency of a newly created time/frequency slot.
5. DiffT field is the difference between ToT and FromT in units of scheduling granularity (e.g., minutes).
6. DiffF field is the difference between ToF and FromF.

Figure 4A:
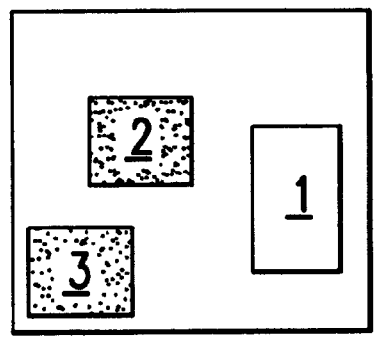
FIGS. 4(a) and 4(b) show an example of a firstleft query.
Figure 4B:
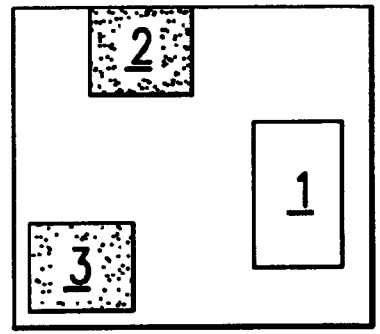

There is a number of auxiliary parametric queries used by the algorithms. Their exact SQL statements are given in Appendix C and their parameters (PResourceID, PFromT, PToT, PFromF, PToF), tagged with a "P" as prefix, correspond to appropriate names of fields in the tables. A functional description of queries is as follows:

1. Intersection query finds all available time/frequency slots which intersect (not just touch) the specified rectangle in the time/frequency domain for a specified resource.
2. Adjacent Free query finds all free time/frequency slots which are adjacent (have a common boundary) to the rectangle specified by the query's parameters.
3. FirstLeft query gives a list of unavailable slots left of PFromT in a strip bound by PFromF and PToF frequencies. These slots are ordered by their ToT in a descending order. The algorithm is interested only in the first (closest) one. FIGS. 4(*a*) and 4(*b*) show two examples of a First Left query graph similar to the preceding Figures. Assume for exposition here that the algorithm is looking for the first unavailable slot left of slot 1 in FIGS. 4(*a*) and 4(*b*). The First Left query will find slots 2 and 3 in FIG. 4(*a*), and the first slot in the sorted list would be slot 2. The same query applied to FIG. 4*b* would not include slot 2 since it does not have common area with the strip defined with the upper and lower boundary of slot 1. The function FirstLeft (see Appendix C) invokes this query and takes care of the default value when there are no left unavailable slots. If the First Left query has no elements, the adjacent slot may be extended all the way up to BeginningOfTime.

4. First Right query is similar to First Left query except that it looks for the first unavailable slot on the right of the specified slot. The function FirstRight (see Appendix C) invokes this query and takes care of the default value when there are no right unavailable slots. If the First Right query has no elements, the adjacent slot may be extended all the way up to EndOfTime.

5. First Up query is similar to First Left query except that it looks for the first unavailable slot above the specified slot. The function FirstUp (see Appendix C) invokes this query and takes care of the default value when there are no upward unavailable slots. If the First Up query has no elements, the adjacent slot may be extended all the way up to the maximum frequency handled by the resource.

6. First Down query is similar to First Left query except that it looks for the first unavailable slot below the specified slot. The function FirstDown (see Appendix C) invokes this query and takes care of default value when there are no downward unavailable slots. If the First Down query has no elements, the adjacent slot may be extended all the way up to the minimum frequency handled by the resource.

7. Sort Temporary Table query sorts the Temporary Table in descending order of DiffT. In case of a tie, records are sorted in descending order of DiffF. By scanning the Temporary Table in an order defined by this query, the algorithm makes sure that a time/frequency slot is scanned after all slots which may contain it.

During scheduling, unscheduling, or the garbage collection process, available slots are fragmented into smaller slots or small slots are expanded into larger slots. In order to keep the database as compact as possible, the algorithm eliminates smaller slots which are subsets of larger slots. Prior to storing newly created slots into Schedule table, the one stored in the Temporary Table. Then, the UnloadTemporaryTable routine (see Appendix C) process processes them slot by slot and stores in the Schedule Table only those which are not a subset of larger slots. Other slots are ignored. The Temporary Table is scanned in the order defined by the Sort Temporary Table query. For each such record, an available slot is found in the Schedule table which is a superset of the slot in the Temporary Table currently being scanned. If there is no such slot, the scanned record is added as a new available slot. Otherwise, it is discarded. After being processed, the record from the Temporary table is deleted.

1.4.4 Initialization

Initially, all resources are available. For that reason, the "Schedule" table is cleared and one record is created per resource as follows:

1. ResourceID=corresponding resource ID
2. FromT=BeginningOfTime
3. ToT=EndOfTime
4. FromF=resource's lowest frequency
5. ToT=resource's highest frequency
6. Status=1 (available)

1.4.5 Inquiry

Inquiry in the time domain is performed in the same way as it was described for indivisible resources.

Inquiry in the frequency domain is performed in the similar way as inquiry in the time domain. Except for the difference between internal representations of date/time, and numerical variables, there is no conceptual difference.

1.4.6 Scheduling

Figure 15:
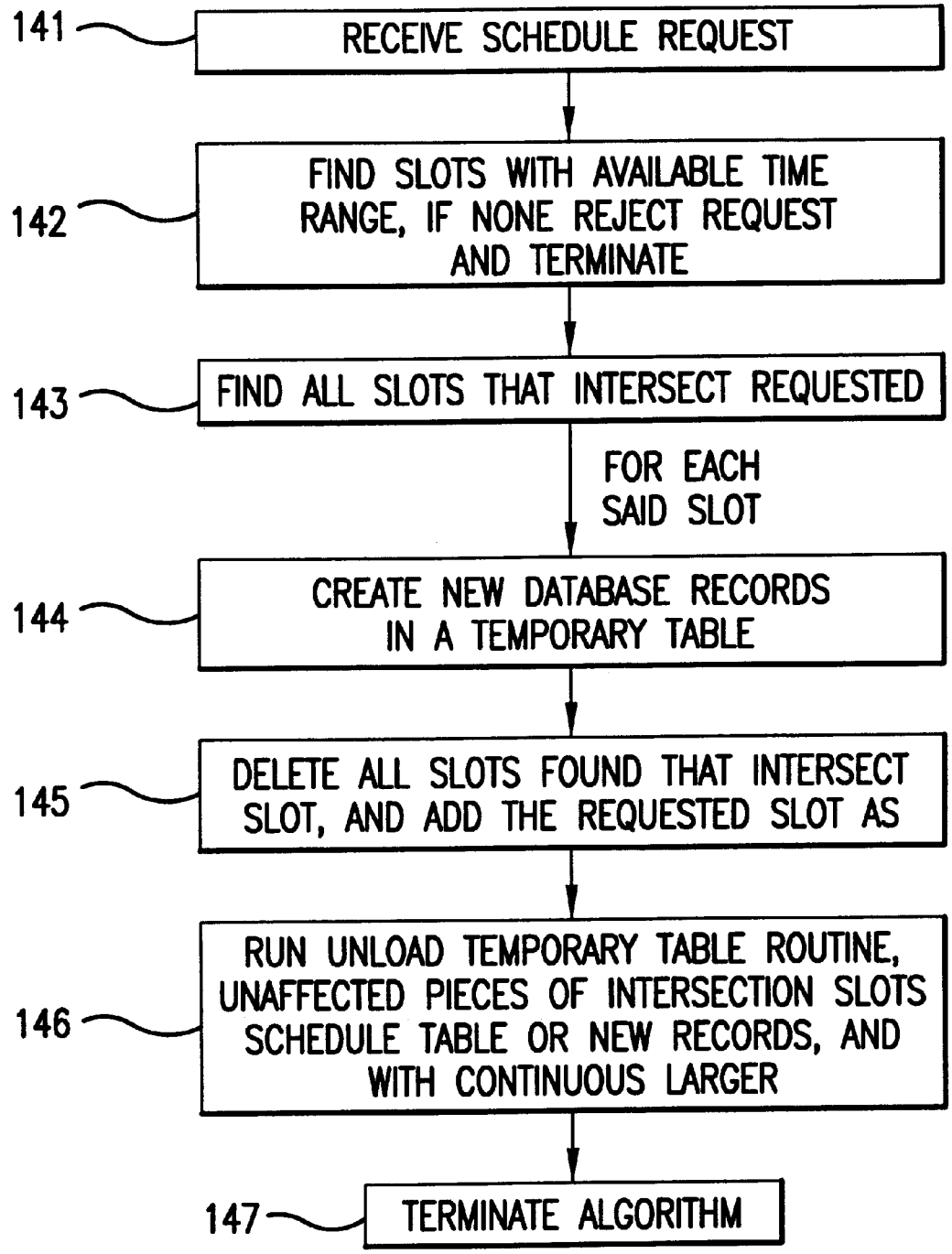
FIG. 15 shows a flow chart for the schedule algorithm for range divisible resources.

To schedule resource X in period between T1 and T2 and frequency range between F1 and F2, the algorithm as shown in FIG. 15 runs as follows, after receiving 141 the scheduled request:

1. Find 142 an available slot (Status=1) which is a superset (ResourceID=X, FromT≦T1, ToT≧T2, FromF≦F1, ToF≧F2) of the required slot. If there is no such slot, the scheduling procedure fails and terminates 142. This may happen in a multi-user environment. Otherwise, continue.

2. Using the parametric query Intersection (see Appendix C), find 143 all available slots which intersect with the requested slot. This may be done by setting query parameters PResourceID, PFromT, PToT, PFromF, and PToF to X, T1, T2, F1, and F2 respectively, and by running the query. Perform step 3 and 4 for each of the found slots and their respective FromT, ToT, FromF, and ToF.

3. For each of the four boundaries of the requested slot, which intersects with the interior of available slots found by query Intersection, create 144 a new record in Temporary Table with appropriately determined corresponding FromT, ToT, FromF, and ToF, and calculated fields DiffT and DiffF. This may generate between 0 and 4 records in the Temporary Table for each slot found by the Intersection query. Zero records would be generated in case the entire available slot is taken by the request. Four records would be generated in a case like the one shown in FIG. 2. Slot 10 shown in FIG. 3, which is requested from the schedule shown in FIG. 2, generates four records in the Temporary Table. Two records are due the to breakup of slot 3, and two slots are due to breakup of slot 4.

4. Delete 145 all available slots found by the Intersection query, and add 145 the requested slot marked as unavailable (Status=2).

5. At this point, the Temporary Table contains pieces remaining after the breakup of all slots which were affected by the newly requested time slot. These must be put 146 into the Schedule table while eliminating 146 slots which are subsets of other (bigger) slots. The UnloadTemporaryTable routine is used 146 for this purpose. As it was mentioned in step 3, the Temporary Table would contain 4 records when slot 10 in FIG. 3 was requested from the schedule shown in FIG. 2. Three of those records corresponds to slots 7, 8, and 9 in FIG. 3. The fourth record corresponds to the shaded rectangle shown in FIG. 3. Scanning the Temporary Table in the prescribed sort order assures that this record is scanned after slot 7 (which is its superset) was scanned and added to the Schedule table.

Therefore, the shaded rectangle is discarded.

6. Terminate 147 the procedure.

1.4.7 Unscheduling

Figure 16:
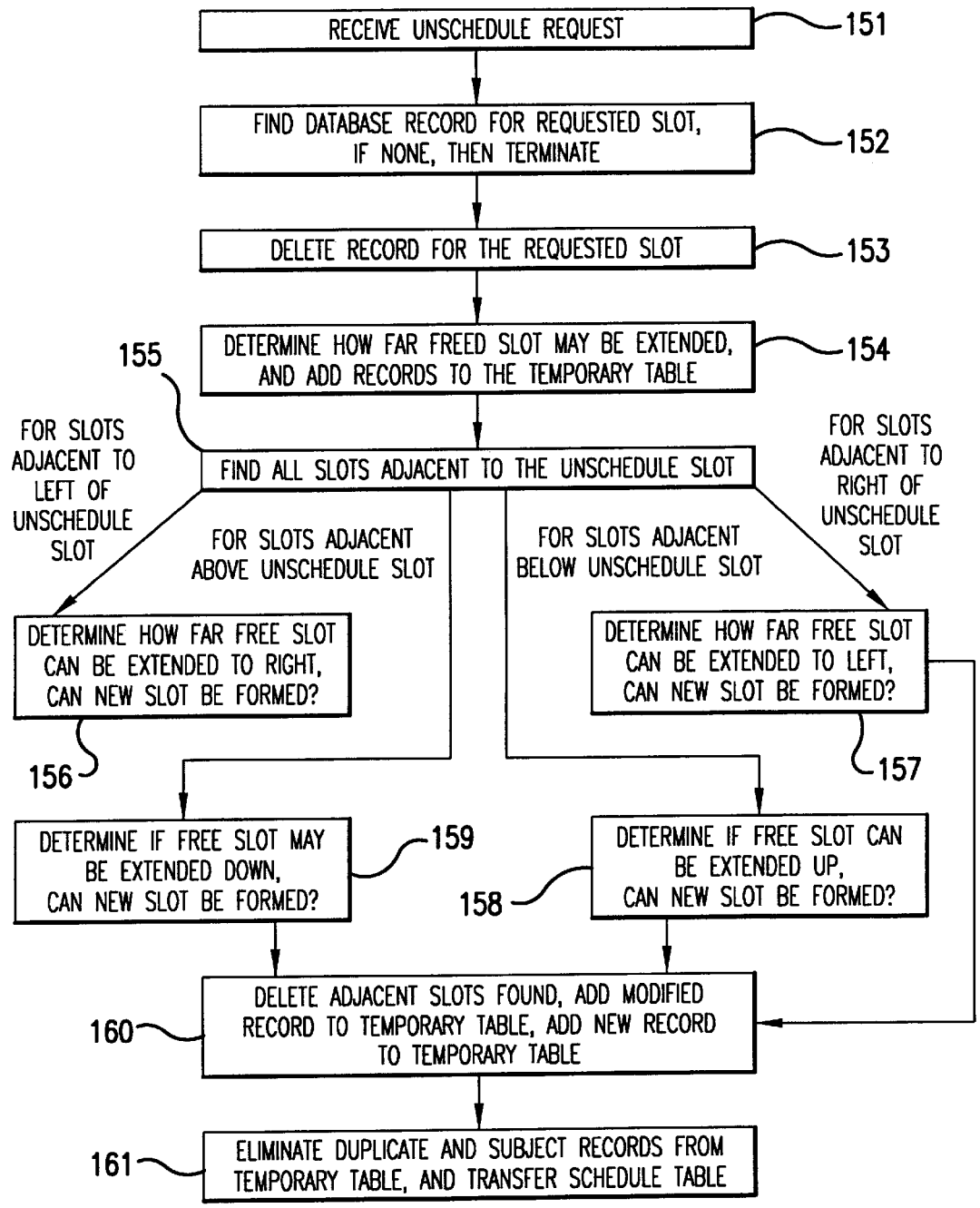
FIG. 16 shows a flow chart for the unscheduled algorithm for range divisible resources.

To unschedule resource X in period between T1 and T2 and frequency range between F1 and F2, the algorithm runs as shown in FIG. 16 after receiving 151 the unschedule request, as follows:

1. Find 152 the scheduled slot (Status=2, ResourceID=X, FromT=T1, ToT=T2, FromF=F1, ToF=F2). If there is no such slot, there is nothing to unschedule and the procedure terminates 152. This may happen in a multi-user environment. Otherwise, continue.

2. Delete 153 the scheduled slot.

3. Using the FirstLeft, FirstRight, FirstUp, and FirstDown functions (see Appendix C) find 154 how far the freed slot may be extended in each direction. The respective new boundaries are L, R, U and D. Add 154 slots (T1, T2, D, U) and (L, R, F1, F2) to the Temporary Table.

4. Using the parametric query Adjacent Free (see Appendix C), find 155 all available slots which are adjacent (have a common boundary) to the unscheduled slot. (These slots are potential candidates for expansion due to the unscheduled slot). This may be done 155 by setting query parameters PResourceID, PFromT, PToT, PFromF, and PToF to X, T1, T2, F1, and F2 respectively, and by running the query. Perform one of steps 5 through 8 (whichever applies) and step 9 for each of the found slots and their respective FromT, ToT, FromF, and ToF.

Figure 5:
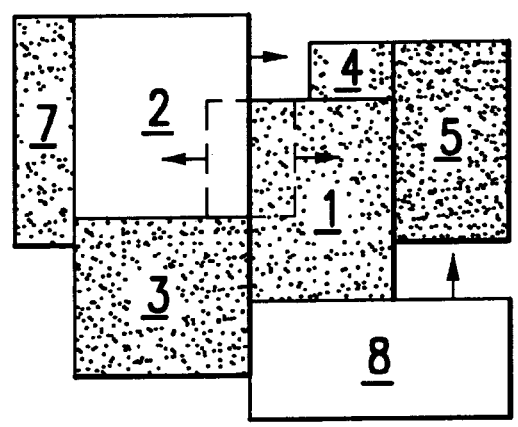
FIG. 5 shows an example of unscheduling.

5. For slots which had their right boundary common with the left boundary of the unscheduled slot, use the FirstRight function (see Appendix C) to find 156 how far the free slot may be extended to the right. If the common boundary between the unscheduled slot and the left adjacent free slot partially belongs to either slot, use the FirstLeft and FirstRight to find 156 if the common boundary may be extended left and right to form a new available slot. FIG. 5 shows an example of unscheduling, on a graph similar to the preceding Figures. To unschedule slot 1 in FIG. 5, available slot 2 may be expanded up to the left boundary of unavailable slot 4. The common boundary between slots 1 and 2 may be expanded to stretch between unavailable slots 5 and 7. Go to step 9.

6. For slots which had their left boundary common with the right boundary of the unscheduled slot, use the FirstLeft function (see Appendix C) to find 157 how far the free slot may be extended to the left. If the common boundary between the unscheduled slot and the right adjacent free slot partially belongs to either slots, use the FirstLeft and FirstRight to find 157 if the common boundary may be extended left and right to form a new available slot. Go to step 9.

7. For slots which had their upper boundary common with the lower boundary of the unscheduled slot, use the FirstUp function (see Appendix C) to find 158 how far the free slot may be extended upward (higher frequency). If the common boundary between the unscheduled slot and the lower adjacent free slot partially belongs to either slots, use the FirstUp and FirstDown to find 158 if the common boundary may be extended up and down to form a new available slot. Note that in FIG. 5, the common boundary coincides with the entire lower boundary of slot 1, and therefore the second part of this step is not performed since this case is covered in step 6. Go to step 9.

8. For slots which had their lower boundary common with the upper boundary of the unscheduled slot, use the FirstDown function (see Appendix C) to find 159 how far the free slot may be extended downward (lower frequency). If the common boundary between the unscheduled slot and the upper adjacent free slot partially belongs to either slots, use the FirstUp and FirstDown to find 159 if the common boundary may be extended up and down to form a new available slot. Go to step 9.

9. Delete 160 the adjacent slot found by running the Adjacent Free query from the Schedule table. Modify 160 the extended boundary as found in one of steps 4 through 7, and add 160 such modified record to the Temporary Table along with the appropriately calculated DiffT and DiffF. If a new slot created by stretching the common boundary should be created, add 160 it also to the Temporary Table.

10. At this point, the Temporary Table contains a number of slots which are candidates for new available slots in the newly created schedule.

However, the algorithm must eliminate 161 duplicates or available slots which are subsets of other available slots. This is done by running the UnloadTemporaryTable routine. As an example, unscheduling of slot 6 in FIG. 2 and expansion of previously available slots create four identical slots in the Temporary Table (after extending slot 2 to the left, slot 3 downward, slot 4 to the right, and slot 5 upward). After eliminating duplicates, the algorithm returns back to the schedule shown in FIG. 1.

1.4.8 Garbage Collection

The scheduling process fragments the available slots into smaller slots. To maintain the database as compact as possible, the algorithm might eliminate unusable slots, i.e., slots which are in the past. The easiest way to do this is to delete the available slots for which ToT is in the past. As an example, such an approach applied after the scheduled event (slot 6) in FIG. 2 expires would leave slots 2, 3, and 5. However, this would still keep slots which are not completely usable, i.e., slots with their FromT in the past and their ToT in the future. (e.g., slots 3, and 5). A solution to this appears to be shortening such slots and changing their FromT to the present time. However, if this is applied to the example in FIG. 2, then shortened slots 3 and 5 would become subsets of slot 2. In order to keep the database compact, this should be avoided. The optimal solution would leave only slot 2 (possibly shortened) in the Schedule table.

To compact the database at time T, the garbage collection algorithm runs as follows:

1. For each resource perform steps 2 through 4.
2. For all available slots with that FromT<T, perform step 3.
3. If ToT≦T discard the slot as completely unusable, and delete it from the Schedule table. Otherwise (i.e., partially usable slot), delete it from the Schedule table, change FromT to T and store it in the Temporary Table.
4. Use UnloadTemporaryTable to eliminate obsolete slots and create new modified slots in the Schedule table.
5. Terminate the algorithm.

The complete code is given in Appendix C.

1.4.9 Database Size

The maximum fragmentation of the scheduling space is achieved when a line (vertical or horizontal) drawn across the scheduling space crosses no more than one unavailable time/frequency slot. In this case there are 5n (n>0) records in the Schedule table.

1.4.10 Extension to Multiple Dimensions

The described algorithms may easily be generalized to handle more than two dimensions (i.e. more than one resource in time, as shown in these examples with only time and frequency). As an example, a scheduled slot in a three dimensional space would be represented as a cube. A record in the Schedule table would have 2×8=16 additional bytes, and the maximum number of records in the table would be 7n. Two additional queries would have to be developed (First Forward and First Backward) and the corresponding calling functions. Additional steps would have to be added in the Scheduling and Unscheduling algorithm to handle two additional boundaries of a slot.

This invention includes a number of algorithms for multi-dimensional scheduling. It describes various types of resources that may be scheduled. It uses a database engine to insure consistency of data in a multi-user environment.

2. Applications to Telecommunication Systems Generally and to Satellite Communication Systems Specifically

2.1 Introduction

A preferred embodiment of the present invention uses the described algorithms for resource management, scheduling, and control software for Bandwidth on Demand ("BOD") satellite networks. Resources in such networks include, for example, satellite bandwidth, power and terrestrial modems. Subject to their availability and the type of request, resources may be acquired immediately (e.g., for telephone calls) or reserved for a later time (e.g., for scheduled video conferences or TV broadcasts).

The architecture is unique in that: (i) it is an excellent framework for the management of a flexible, vendor-independent network; (ii) it allows the end-users to, subject to their system privileges, to inquiry resource availability on-line, to request network resources, and to reconfigure the network; (iii) it is built to suit business needs of satellite service providers.

Satellite communications is an evolving technology with a variety of telecommunications applications. Satellite communications systems may have advantages in broadcasting over terrestrial communications systems.

Recent advances in Very Small Aperture Terminal (VSAT) technology provided fertile ground for effective use of satellites in global communications. There are several projects competing for their eventual position in the global communications market. They differ in communications technology using, for example, Frequency Division Multiple Access (FDMA), Time Division Multiple Access (TDMA), or Code Division Multiple Access (CDMA). They also differ in satellite deployment strategy Some use a small number of large satellites in high geostationary orbits (35,860 kilometers), and some use a large number of small Low Earth Orbit (LEO) satellites (between 500 and 1,400 kilometers). The proposed projects also differ in their satellite network topology Some individually operate satellites while others use satellites mutually connected in a mesh network topology No matter which project wins dominant market share, the remaining issue will be the user's prospects for effective use and management of such a satellite network. A satellite communications network consists of a number of satellite resources, such as bandwidth, power and terrestrial resources such as modems. The effective use of satellite power and bandwidth favors Bandwidth On Demand (BOD) assignment over permanently assigned circuits. This means that satellite resources are assigned only when they are actually needed and used. In such a way a higher utilization of resources may be achieved and the resources may be available to a larger number of potential users.

The present invention includes a software defined BOD network architecture. The term "software defined" means that the network configuration, as perceived by end-users (e.g., connectivity and network services), may be dynamically modified from a centralized network management center Furthermore, end-users may remotely request modifications of network configuration tailored to their evolving needs. Changes may be executed immediately or may be scheduled for a later time. The network management system keeps track of current and future availability of satellite and terrestrial resources, and accordingly may or may not grant user requests.

2.2 BOD Networks

2.2.1 Network Architecture

Figure 6:
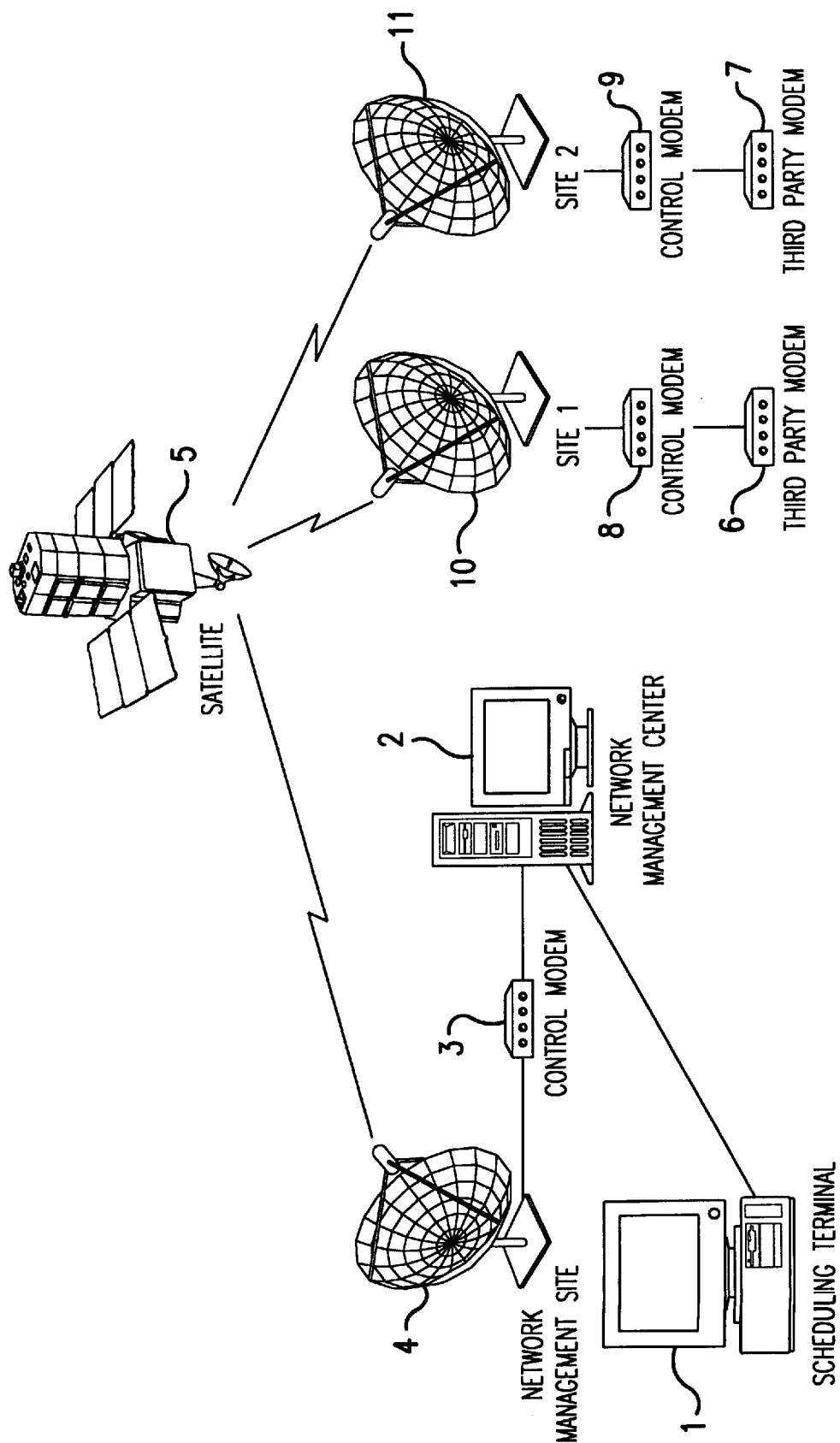
FIG. 6 shows an example of Bandwidth on Demand ("BOD") network architecture.

FIG. 6 depicts the BOD network architecture of the present invention. Connectivity of a full mesh network is achieved via one or more satellites 5. There are multiple sites 4, 10 and 11 which may communicate via the satellite 5. Each site has a modem 3, 8 and 9, respectively which is used as a device controller. The modem controls other third party modems 6 and 7 at the site. Overall control of the network is achieved from the centralized network management center 2. The center 2 controls remote devices in the network by communicating with other control modems 8 and 9 via its own control modem 3.

FIG. 6 shows an example of Bandwidth on Demand ("BOD") network architecture of the present invention for the satellite telecommunication system. The scheduling terminal 1 runs the scheduling software (not shown). The scheduling software schedules the use of resources in the system and electronically communicates with the network management center computer 2. The terminal 1 downloads the schedule to the center computer 2, and the center computer 2 controls the use of resources in the system. In this way the scheduling software in the terminal 1 schedules and directly controls the resources in the system, which is novel to the present invention.

The center computer 2 electronically communicates through a control modem 3 to a network management site 4, which may be a satellite uplink/downlink. The management site 4 electronically communicates with a telecommunication satellite 5 in orbit in space, and controls the resources of the satellite 5 pursuant to the schedule and control software in terminal 1.

In the preferred embodiment, the control modem 3 is as supplied by Telogy Networks Inc. of Germantown, Md.

The scheduling terminal 1 can receive information for events to schedule by a variety of common telecommunication links (not shown), or manually (not shown).

The telecommunication satellite 5 provides its communication services according to the scheduling and control software in the terminal 1. The services are provided to a plurality of third party users (not shown). Each third party user electronically communicates through a third party modem 6 or 7. (The system can have a plurality of third party modems, but only two are shown here for convenience.) Each third party modem 6 or 7, communicates electronically through a control modem 8 or 9, to a ground site 10 or 11, to satellite 5. (The system may have a plurality of control modems 8, 9 communicating from the third party modems 6, 7, to a plurality of ground sites 10, 11, all over which can be corrected by a variety of telecommunication links. For convenience, only two of each such elements are shown here, connected in a simple configuration.)

The software in terminal 1 schedules and controls the resources in the system, including those in the satellite 5, the plurality of ground sites 10, 11, the plurality of third party control modems 8, 9, the plurality of third party modems 6, 7, and any other system resources (not shown).

The software in the terminal 1, carries a database of the system resources, and schedules and controls the resources using algorithms for indivisible resources, range divisible resources, and percentage divisible resources, in response to schedule requests for current and future use of these resources.

The electronic telecommunication links shown in FIG. 6 can be any of the common telecommunication links, including, for example LAN, WAN, telephony, Internet and wireless to and from the satellite 5, as appropriate and convenient.

In the preferred embodiment, communication in the network is achieved using the Single Channel Per Carrier ("SCPC") technology. When a request for a circuit arrives, it is established using the control modems. Multiple messages are combined in a single channel using the FDMA. However, the present invention is not limited to this mode of the preferred embodiment. For example, alternate embodiments may use MCPC and TDMA while using the same scheduling algorithms of the present invention.

To successfully establish a connection, sufficient bandwidth on an appropriate satellite transponder must be available at the requested time. There must be enough power available, i.e., power may be unavailable due to other activities on the satellite. Also, all participating modems must be available.

When sites no longer need to communicate, the communication channel (e.g., in the preferred embodiment, an SCPC circuit) is automatically released and allocated resources are freed for subsequent use.

Events, e.g., video conferences, may be ordered/scheduled on-line directly by eligible users who have their user accounts created in the system. The users log into the system from remote Scheduling Terminals, and order events, based on the specified requests and availability of the system. For customers without access to Scheduling Terminals, events may be ordered over the phone, and entered in the system by the satellite services provider personnel (Schedulers).

To achieve complete control of such a network, the present invention keeps track of scheduled changes in the dynamically modified network configuration. Some modems are transportable (e.g., located on trucks) and roam from site to site. Also, antennas on satellite transponders may be repositioned to provide different coverage.

The network management center keeps track of ongoing and scheduled upcoming events. The router automatically starts, stops, configures and re-configures remote third party modems. Network operators may monitor the state of the network in real-time, and view network alarms, events in progress, upcoming scheduled events, and upcoming scheduled changes in the network configuration.

The described network architecture of the present invention is an excellent framework for management of a flexible, vendor-independent network.

2.2.2 Network Applications

There are two types of BOD applications (i.e., requests for connection):

Applications such as telephone calls may be initiated ad-hoc upon request (i.e., on demand). Subject to availability of requested resources, the connection is established immediately The duration of requests is generally not known in advance.

So called occasional services are applications like video conferences and TV broadcasts. They are scheduled in advance and their start and stop times are generally known. The term "occasional" is a somewhat confusing industry-wide term which contradicts the fact that there may be hundreds of events scheduled per day There may be some variations on scheduling policy which depend on business practices of a satellite service provider For example, an event may be scheduled with an "approximate end" when some slack to completion time is allowed. The service provider will attempt to keep the slack time period available and allow the user to go over the scheduled time. The user makes the decision about the use of slack time during the event (e.g., over time in a sports event broadcast). However availability of additional time is not guaranteed at the time of event.

Each event in the network may require one or more transmitting modems. Each transmitting modem may be heard by one or more receiving modems. Depending on the number and function of participating modems, there are three typical cases:

Point-To-Point connection comprises two modems which may transmit and receive simultaneously (i.e., full duplex). This configuration may be used for telephone calls.

Broadcast connection requires one transmitting and several receiving modems. This configuration may be used for TV broadcasting.

Multicast connection may be used for video conferencing. Participants in the event send their audio/video signals to a central location which must have one receiving modem for each participant. Using video equipment, the received video signals are combined into a single audio/video signal (multiple pictures in a picture) and broadcast back to all participants.

2.2.3 System Users

There are several types of system users with various levels of privileges:

Administrators maintain the system and have access to all information about the system (e.g., system resources and user accounts).

Schedulers handle orders over the phone or e-mail and generally have access to information about all scheduled events.

Satellite operators monitor ongoing and immediately upcoming events on a real-time monitor They also handle scheduled repositioning of antennas on the satellite transponders.

General users are customers of the satellite services provider They may remotely log into the system and order/schedule events. Their view of the information in the system is restricted to general information about the availability of the system resources as well as their own events.

2.3 Resources in BOD Networks 2.3.1 Resource Management

The present invention allows multiple users to access (i.e., read or modify) information (i.e., characteristics and availability) about system resources. To facilitate this, the information is kept in a centralized database which may be accessed in a distributed (client/server) manner The integrity of the database is preserved using standard database/record locking mechanisms.

There are several operations that may be performed with a resource:

Creation is the process of defining a new resource and making it available for subsequent scheduling.

Modification is the process of changing the characteristics of a resource. Care must be taken that changes do not conflict with the requirements of events which are already scheduled to use the resource.

Deletion is the process of removing a resource from the system. Events which are scheduled to use the resource must be accommodated for a deleted resource, or the resource must be deleted.

Inquiry is the process of finding available resources subject to specified characteristics like the availability in time or the physical characteristics of a resource. The user must be able to first partially specify the user's needs and then to gradually narrow down the selection of needs. For example, a partially specified time requirement would be the duration of an event (e.g., flexible start time) while a complete time requirement is start time and duration (or equivalently start and stop time). Based on the specified requirements, available resources must be listed in a prioritized way so that less valuable (or less flexible) resources are scheduled first.

Scheduling is the process of reserving an available resource, thus making it unavailable for subsequent requests. A special type of scheduling is blocking resources in certain intervals so they cannot be used although they are not assigned to any particular event (e.g., for maintenance). An important characteristic of a scheduling algorithm is the amount of storage needed to keep information about scheduled events.

Unscheduling is the process of freeing scheduled resources.

Garbage collection is the process of removing useless information from the system. For example, information about an available time-slot should be removed after the end time of that slot has passed.

2.3.2 General Resource types.

There are three different general resource types:

Indivisible resources are scheduled on an all-or-nothing basis. At any point of time, a resource is either entirely available or entirely assigned to a particular event.

Range divisible resources are scheduled in a two-dimensional scheduling space. One dimension is time while the other dimension is application specific, for example, frequency A scheduled event is represented as a rectangle in the time/frequency domain, meaning that other events cannot use the resource in the specified time and frequency range.

Percentage divisible resources may be shared among various events at the same time. Unlike for range divisible resources, it is irrelevant which particular section of the resource is scheduled. Power on the satellite is an example of a percentage divisible resource. Availability of such a resource may be represented as a bar chart. A request may be granted if the requested amount of power is below the bar chart (i.e., power is available) in the requested time interval.

There may be application specific variations of the way the three resource types are scheduled.

2.3.3 BOD Network Specific Resources

A. Satellites/Transponders/Bandwidth Pools

The present invention may handle multiple satellite systems. Each satellite has multiple transponders. Each transponder has one or more bandwidth pools. The bandwidth pools are resources which are scheduled as range divisible (i.e., two-dimensional) resources.

Figure 7:
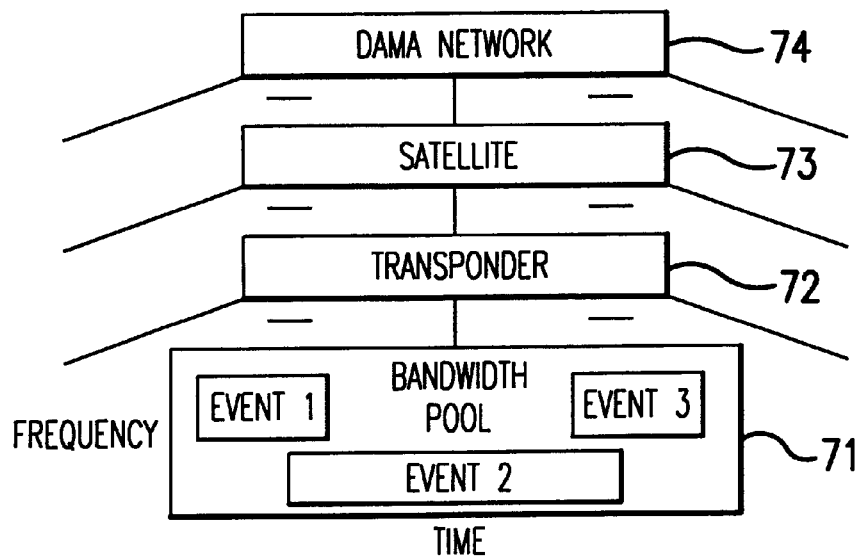
FIG. 7 shows an example of a hierarchy of information about satellites, transponders, and bandwidth pools.

The hierarchy of information about system components is shown in FIG. 7. A graph of a resource schedule 71, similar to FIGS. 1 to 5 herein, is shown. The graph 71 is in a tier beneath transponder information 72, satellite information 73, and BOD network information 74.

Characteristics of transponders, relevant to their proper selection, are as follows.

Uplink access is the general area on the Earth from which the transponder may be reached. An example may be "North America".

Downlink access is the general area on the Earth which may be reached from the transponder It is also known as the "transponder's footprint". These areas may be prioritized. For example, let transponders A and B have downlink access "Europe" and "North Europe". Transponder A has a broad beam and transponder B has a spot beam. Then to reach London, transponder B is a better choice since transponder A has broader coverage and should be preserved for later use by requests which cannot be handled by transponder B (e.g., a broadcast to London and Athens).

In practice, two transponders may be "networked" and used together to cover very large areas such as multiple continents. For example, transponder A may have uplink access in North America and downlink access in Europe. Transponder B may have the opposite uplink and downlink accesses. If networked together they may be used to broadcast a signal from one continent to both continents. In the example embodiment described herein transponders such as a single valuable (i.e., high priority) transponder whose downlink access is "North America/Europe" is described.

The receiving and transmitting antennas on a transponder may be fixed or moveable. This means that, for example, downlink access may be "North Europe" in one period of time and "Central Europe" in another To handle this case, uplink and downlink accesses must be scheduled in time. The example embodiment system described herein generates so called "switch orders" and warns satellite operators ahead of time that a transponder's antenna should be repositioned. mailable bandwidth of each transponder may be divided in one or more bandwidth pools. They are scheduled and shared among multiple events as range divisible resources.

B. Satellite/Transponder Power

Power is another resource which is scheduled. It may happen that there is enough bandwidth on an appropriate transponder but a request cannot be granted since there is not enough power available. Power may be either a global resource on a satellite or each transponder may have its pre-assigned budget of available power Power is scheduled as a percentage divisible resource and its availability in time may be presented as a bar chart.

C. Modems

Modems eligible for participation in events are selected based on the following criteria:

Communications characteristics include, for example, frequency range/bandwidth, modulation type, and bandwidth overhead. The system described in this paper maintains user definable link profiles which are combinations of characteristics bundled under symbolic names such as "16k voice". This feature facilitates selection of appropriate modems.

The modem's location defines the network topology The modem's location influences eligibility of transponders and their bandwidth pools. For example, the user may first request New York as a transmitting location. This will narrow down the list of eligible transmitting modems to those that are located in New York, and eligible transponders to those which have North America for uplink access. Then, the user may add London as a receiving location. This will further narrow down eligible transponders to those which have Europe or North Europe as downlink access. If the user adds Athens as the second receiving location, then only transponders whose downlink access is Europe will be eligible.

Scheduling of modems is further complicated by the fact that a large portion of modems used by satellite service providers are transportable, i.e., their location is not fixed. To handle this case, locations of modems must be scheduled in time. For example, a modem may be in Berlin today nowhere tomorrow (i.e., on the road), and in Paris in two days.

The system maintains the list of known sites. Generally granularity of sites is at the level of cities, but may also be more or less coarse. The system also maintains a relationship between sites and uplink/downlink areas. For example, London belongs both to Europe (broad beam transponder) and North Europe (spot beam transponder). The system facilitates the selection which provides the best coverage or quality of signal on the ground. Sites which are closer to the edge of the transponder's footprint have a poorer quality of signal. The system maintains this information for each site and each footprint the site belongs to.

2.4 Scheduling Algorithms

Scheduling algorithms for uplink/downlink access, modems, bandwidth pools, and power are included in the present invention. Uplink/downlink access and modems are handled as indivisible resources with slight variations. Bandwidth pools are scheduled as range divisible (two-dimensional) resources. Power is scheduled as a percentage divisible resource.

Information on resource availability is stored in a centralized database. The users (partially) specify their requests and gradually narrow down their choice. The requests, specified via a user-friendly graphical interface, are translated in Structured Query Language (SQL) statements. They are used to inquiry the database on availability of resources. Simplicity and efficiency of the SQL statements was the major factor in the design of data structures used to store information on resource availability.

2.4.1 Uplink/Downlink Access

Figure 8:
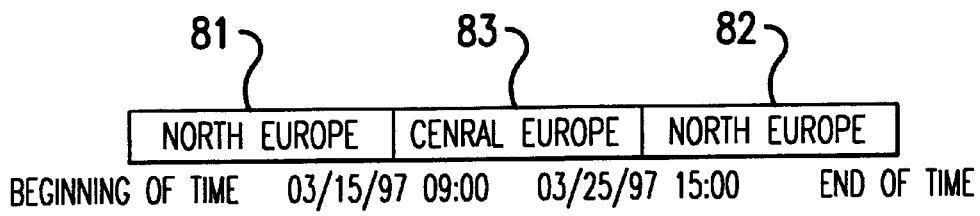
FIG. 8 shows an example of an uplink and downlink access schedule.

FIG. 8 depicts a sample schedule of a transponder's uplink/downlink access. Three blocks 81, 82, 83 are scheduled during the life-time of a transponder (in a satellite). For example, to reposition a transponder's antenna in the middle section 83 section so it points to South Europe instead of Central Europe, the present invention splits the middle section 83 into up to three blocks (that is, Central Europe, South Europe and Central Europe), depending on the start and stop times of the South Europe block.

The change cannot be performed in case there are events scheduled on the transponder during the new position interval.

The number of records per transponder in the database is equal to the number of changes in transponder's antenna position.

2.4.2. Modems

Figure 9:
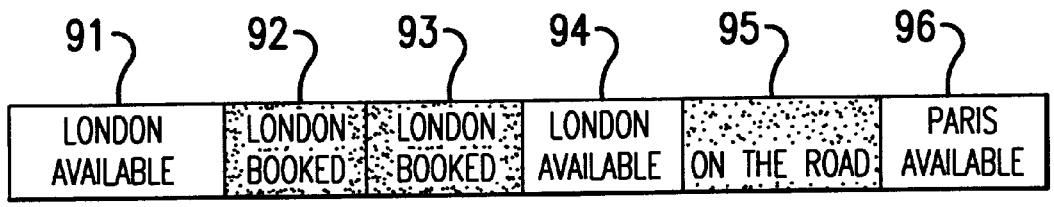
FIG. 9 shows an example of a modem schedule.

FIG. 9 depicts an example of a transportable modem schedule. The time-line is divided in time intervals 91, 92, 93, 94, 95, 96. Black blocks 92, 93 denote busy intervals. Two back-to-back events are scheduled in the Figure. White blocks 91, 94, 96 denote available intervals, and gray blocks 95 denote intervals when the modem is incommunicado (e.g., on the road).

In order to be eligible for scheduling, an available white block 91, 92, 96 must completely contain the requested interval, and the modem's location must match the requested location.

Depending on the relationship between requested and available start/stop times, the originally available slot may be completely booked, or split to one available and one unavailable interval, or split to two available and one unavailable interval in the middle of the originally available interval.

If an event is canceled, the freed slot must be merged with any of the adjacent free slots in the same location. This will form a larger available interval.

As a part of garbage collection, any free slot should be deleted after it becomes obsolete, i.e., its end time passes.

The number of records per modem in a schedule is proportional to two times the number of scheduled events plus the number of times the modem is relocated. The worst case (maximum fragmentation of available blocks) occurs when there are no back-to-back events. The best case is equal to the number of scheduled events plus the number of times the modem is relocated. This happens when all events are scheduled back-to-back.

2.4.3 Bandwidth Pools

The two-dimensional scheduling of bandwidth pools is more complex. FIGS. 10(a)–10(c) 10 depicts a two-dimensional schedule of a bandwidth pool in the process of scheduling two events. Available white blocks 1, 2, 3, 4, 5, 7, 8, 9 and unavailable gray blocks 6, 10 are represented as rectangles in the two-dimensional time/frequency space (similar to FIGS. 1 to 5 herein). In order to be able to schedule a new request (a rectangle in time/frequency domain), prior to modification of schedule, it must fit in at least one available block 1, 2, 3, 4, 5, 7, 8, 9.

Unavailable blocks cannot overlap with any other block (available or unavailable). Available blocks may mutually overlap. In order to keep the amount of information at a minimum, no available block may be a subset of another available block. Note that, in order to better view boundaries of adjacent/overlapping blocks in FIGS. 10(a)–10(c), blocks are slightly shifted with respect to each other.

Figure 10A:
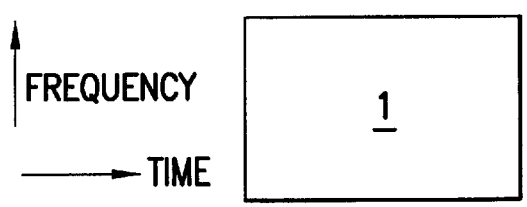
FIGS. 10(a)–10(c) show an example of a bandwidth pool schedule.

FIG. 10(a) depicts the initially empty schedule when the entire time/frequency domain is available, and the schedule is represented as a single big available block. The first request, block number 6 in FIG. 10(b), fits in the initial empty block number 1 in FIG. 10(a). After the first request is scheduled, the initial available block is split into one unavailable and 4 available blocks in FIG. 10(b). As can be seen, some of the available blocks overlap (e.g., 3 and 4).

Figure 10B:
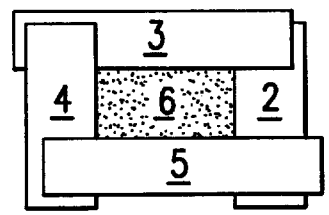
Figure 10C:
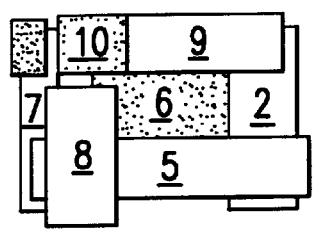

The next request, block number 10 in FIG. 10c, fits in the available block number 3 in FIG. 10b. It also overlaps with available block number 4. After the second request is scheduled, block number 3 is split into three blocks: available block 9, unavailable block 10, and an available small black block. Also, block 4 is split into available blocks 7 and 8 which overlap. Since the small black block in FIG. 10(c) is a subset of block 7, it does not provide any additional information on bandwidth pool availability Future requests that fit in the black box will also fit into block 7. Therefore, the black box is discarded. Any subsequent request must be a subset of at least one of the white blocks in FIG. 10(c).

Unscheduling runs in the opposite direction and combines free blocks into larger free blocks. Garbage collection discards all free blocks prior to (left of) current time.

The number of records per bandwidth pool in the schedule (available and unavailable blocks) is proportional to about five times the number of events, in the worst case with maximum fragmentation. In the best case the number of records per bandwidth pool in the schedule is equal to the number of scheduled events.

2.4.4 Power

Figure 11:
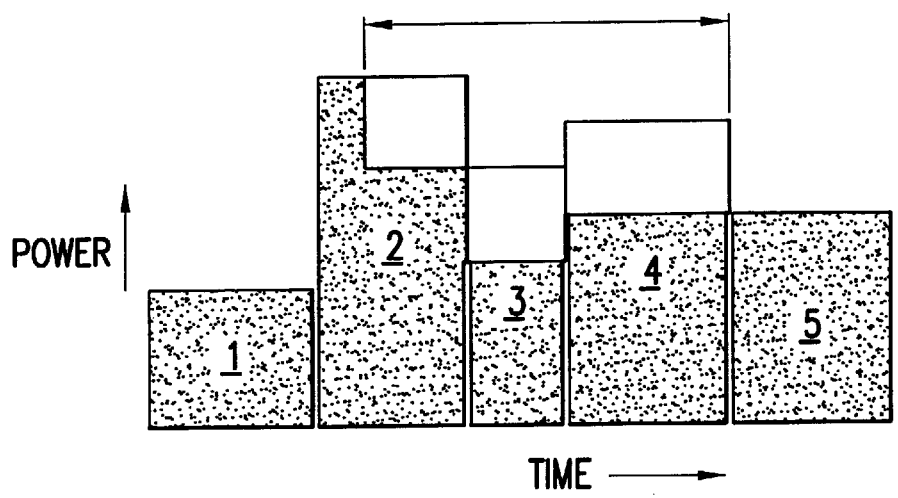
FIG. 11 shows an example of power scheduling.

FIG. 11 depicts an example of power scheduling in a graph similar to FIGS. 1 to 5, except the vertical axis indicates the power resource. Prior to scheduling a new request, there were in this illustrative example, five time intervals (1–5) represented as five bars in the bar chart. The available power is defined by the height of the chart.

A request is issued in the interval defined by the double-headed arrow The amount of requested power, defined by the height of white rectangles, is smaller than the minimum available in the requested interval (i.e., bar number 3), and therefore the request may be granted. The same amount of power is deducted from each of the affected intervals. Bars in the middle are shortened by the same amount. The start of the request falls in the middle of interval number 2, so the interval must be split into two smaller intervals. The height of the left bar remains the same while the right bar is shortened by the amount of requested power. The end of the request coincides with the end of interval number 4, and therefore this bar does not have to be split to two intervals. However after bar 4 is shortened, it becomes as high as bar number 5, and therefore they should be merged in a single larger interval.

The unscheduling algorithm proceeds in the same way except that the "requested" power is negative. The garbage collection algorithm discards all intervals after their ends pass.

The number of records per power pool (one pool per satellite or one pool per transponder) in the schedule is proportional to two times the number of events. This is the worst case with maximum fragmentation. The best case is equal to one when, e.g., all events are scheduled back-to-back and all require the same amount of power.

This invention includes scheduling algorithms for various resources (e.g., satellite power and bandwidth, and terrestrial modems) in a software defined BOD satellite network. These algorithms allow ad-hoc bandwidth allocation (e.g., telephone calls) as well as events scheduled ahead of time (e.g., video conferences). The presented network architecture is a new improvement of the present invention the provides unique framework for creating a user-configurable, flexible, vendor-independent network.

The embodiments as illustrated and discussed in this specification are intended only to teach those skilled in the art the best way known by the inventor to make and use the invention. Nothing in the specification should be considered as limiting the scope of the present invention. Many changes could be made by those skilled in the art to produce equivalent systems and methods without departing from the invention. The present invention should be limited only by the following claims and their legal equivalents.

The term "scheduling" may be sometimes used broadly herein to include both scheduling and unscheduling.

We claim:

1. A satellite communication system comprising:
   a. at least one telecommunication satellite in orbit,
   b. at least one ground site, communicating with said at least one satellite,
   c. at least one first control modem communicating with each said at least one ground site,
   d. at least one third party modem communicating with each said first control modem,
   e. a network management ground site communicating with the satellites,
   f. a second control modem electronically communicating with the network management ground site,
   g. a network management center electronically communicating with the second control modem,
   h. a scheduling terminal computer electronically communicating with the network management center,
   i. scheduling and control software in the scheduling terminal computer with algorithms for multidimensional scheduling and unscheduling of (a) indivisible resources, (b) percentage divisible resources, and (c) range divisible resources, and
   j. a database in the scheduling terminal computer containing data regarding the status of resources of the satellite system, and schedules for the use of such resources, wherein
      (A) the algorithm for scheduling the use of an indivisible resource, comprises:
         (Aa) receiving a request to schedule an indivisible resource for a requested interval,
         (Ab) searching in a resource database for an available record that matches the request, and, if such an available record is not found, rejecting the request, otherwise,
         (Ac) if an available record is found, making the available record unavailable for the requested interval,
         (Ad) creating a new record for any portion of the available record prior to the requested interval, and
         (Ae) creating a new record for any portion of the available record after the requested interval; and
      (B) the algorithm for scheduling the use of a percentage divisible resource, the process comprises:
         (Ba) receiving a request to schedule a percentage divisible resource,
         (Bb) searching all database records corresponding to a time period to be effected by the request, and, if the available resource level is inadequate in any such records, then rejecting the request, otherwise,
         (Bc) for each record that would be effected by satisfying the request, adjusting the available level up for any amount requested to be unscheduled, and adjusting the available resource level down for any resource requested to be scheduled,
         (Bd) creating a new record for any time slot prior to the time of the time period to be effected by the requests with an uncharged level of the available resource, and merging the new prior record with any left slot with the same level of resource available, and
         (Be) creating a new record for any time slot following the time of the time period to be effected by the requests with an uncharged level of the available resource, and merging the new following record with any right slot with the same level of resource available; and
      (C) the algorithm for scheduling the use of a range divisible resource comprises:
         (Ca) receiving a request to schedule a range divisible resource,
         (Cb) searching for an available record in a resource database with time and range that matches the request, and if no such record is found, rejecting the request, otherwise
         (Cc) finding all slots that intersect the requested slot,
         (Cd) for each such intersecting slot, creating a new database record in a temporary table,
         (Ce) deleting all slots that intersect the requested slot, and adding an unavailable database record for the requested slot, and
         (Cf) running an unload temporary table routine, moving unaffected pieces of intersecting slots to the schedule table as new records and merging such new records with contiguous larger slots.

2. The system in claim 1, wherein
   (D) the algorithm for unscheduling the use of an indivisible resource comprises:
      (Da) receiving a request to unschedule an indivisible resource for a time period,
      (Db) searching for a scheduled record for that resource in a resource database that matches the time period for the request, and if such a record is not found, rejecting the request, otherwise
      (Dc) searching for a immediately prior available record for the scheduled resource which ends when the resource which is about to be unscheduled starts,
      (Dd) searching for a immediately subsequent available record for the scheduled resource which starts when the resource which is about to be unscheduled ends,
      (De) if there is no immediately prior available record and no immediately subsequent available record, then changing the scheduled record to available, otherwise (Df) if there is a immediately prior available record and no immediately subsequent available record, then deleting the immediately prior available record, expanding the scheduled record to include the immediately prior available record, and changing the scheduled record to available, and otherwise, (Dg) if there is a immediately subsequent available record and no immediately prior available record, deleting the immediately subsequent available record, expanding the scheduled record to include the immediately subsequent available record, and changing the scheduled record to available, and (E) the algorithm for unscheduling the use of a range divisible resource comprises:

(Ea) receiving a request to unschedule a range divisible resource, (Eb) searching for an available database record matching the requested resource, and, if no such record exists, rejecting the request, otherwise, (Ec) deleting the record for the requested slot, (Ed) determining how far the unscheduled slot may be extended, and adding all such records to a temporary table, (Ee) finding all slots adjacent to the unscheduled slot, (Ef) for all slots adjacent to the left of the unscheduled slot, determining how far the adjacent slots can be extended to the right, and creating a new slot if possible, then going to step Ej, (Eg) for all slots adjacent to right of the unscheduled slot, determining how far the adjacent slots can be extended to the left, and creating a new slot if possible, then going to step Ej, (Eh) for all slots adjacent below the unscheduled slot, determining how far the adjacent slots can be extended up, and creating a new slot if possible, then going to step Ej, (Ei) for all slots adjacent above the unscheduled slot, determining how far the adjacent slots can be extended down, and creating a new slot if possible, then going to step Ej, (Ej) deleting all found adjacent slots from the temporary table, adding modified records to the temporary table, and adding new records to the temporary table, and (Ek) eliminating duplicate records and subset records from the temporary table and transferring other records from the temporary table to the schedule table.

3. A satellite communication system comprising:

a. at least one telecommunication satellite in orbit, b. at least one ground site, communicating with said at least one satellite, c. at least one first control modem communicating with each said at least one ground site, d. at least one third party modem communicating with each said first control modem, e. a network management ground site communicating with the satellites, f. a second control modem electronically communicating with the network management ground site, g. a network management center electronically communicating with the second control modem, h. a scheduling terminal computer electronically communicating with the network management center, i. scheduling and control software in the scheduling terminal computer with algorithms for multidimensional scheduling and unscheduling of (a) indivisible resources, (b) percentage divisible resources, and (c) range divisible resources, and j. a database in the scheduling terminal computer containing data regarding the status of resources of the satellite system, and schedules for the use of such resources, wherein the algorithm for scheduling the use of an indivisible resource, comprises:

(a) receiving a request to schedule an indivisible resource for a requested interval, (b) searching in a resource database for an available record that matches the request, and, if such an available record is not found, rejecting the request, otherwise, (c) if an available record is found, making the available record unavailable for the requested interval, (d) creating a new record for any portion of the available record prior to the requested interval, and (e) creating a new record for any portion of the available record after the requested interval.

4. A satellite communication system comprising:

a. at least one telecommunication satellite in orbit, b. at least one ground site, communicating with said at least one satellite, c. at least one first control modem communicating with each said at least one ground site, d. at least one third party modem communicating with each said first control modem, e. a network management ground site communicating with the satellites, f. a second control modem electronically communicating with the network management ground site, g. a network management center electronically communicating with the second control modem, h. a scheduling terminal computer electronically communicating with the network management center, i. scheduling and control software in the scheduling terminal computer with algorithms for multidimensional scheduling and unscheduling of (a) indivisible resources, (b) percentage divisible resources, and (c) range divisible resources, and j. a database in the scheduling terminal computer containing data regarding the status of resources of the satellite system, and schedules for the use of such resources, wherein the algorithm for scheduling the use of a percentage divisible resource, the process comprises:

(a) receiving a request to schedule a percentage divisible resource, (b) searching all database records corresponding to a time period to be effected by the request, and, if the available resource level is inadequate in any such records, then rejecting the request, otherwise, (c) for each record that would be effected by satisfying the request, adjusting the available level up for any amount requested to be unscheduled, and adjusting the available resource level down for any resource requested to be scheduled, (d) creating a new record for any time slot prior to the time of the time period to be effected by the request, with an uncharged level of the available resource, and merging the new prior record with any left slot with the same level of resource available, and (e) creating a new record for any time slot following the time of the time period to be effected by the request, with an uncharged level of the available resource, and merging the new following record with any right slot with the same level of resource available.

5. A satellite communication system comprising:

a. at least one telecommunication satellite in orbit, b. at least one ground site, communicating with said at least one satellite, c. at least one first control modem communicating with each said at least one ground site, d. at least one third party modem communicating with each said first control modem, e. a network management ground site communicating with the satellites, f. a second control modem electronically communicating with the network management ground site, g. a network management center electronically communicating with the second control modem, h. a scheduling terminal computer electronically communicating with the network management center, i. scheduling and control software in the scheduling terminal computer with algorithms for multidimensional scheduling and unscheduling of (a) indivisible resources, (b) percentage divisible resources, and (c) range divisible resources, and j. a database in the scheduling terminal computer containing data regarding the status of resources of the satellite system, and schedules for the use of such resources, wherein the algorithm for scheduling the use of a range divisible resource comprises:

(a) receiving a request to schedule a range divisible resource, (b) searching for an available record in a resource database with time and range that matches the request, and if no such record is found, rejecting the request, otherwise (c) finding all slots that intersect the requested slot, (d) for each such intersecting slot, creating a new database record in a temporary table, (e) deleting all slots that intersect the requested slot, and adding an unavailable database record for the requested slot, and (i) running an unload temporary table routine, moving unaffected pieces of intersecting slots to the schedule table as new records and merging such new records with contiguous larger slots.

* * * * *